United States Patent [19]
Goumillou

[11] Patent Number: 5,836,008
[45] Date of Patent: Nov. 10, 1998

[54] COMMUNICATIONS INTERFACE FOR CONNECTION BETWEEN TELECOMMUNICATIONS EQUIPMENT AND INTERFACE MODULES

[76] Inventor: Daniel Goumillou, 16, rue du Docteur Roux, 91430 Vauhallan, France

[21] Appl. No.: 500,841
[22] PCT Filed: Dec. 8, 1994
[86] PCT No.: PCT/IB94/00400
  § 371 Date: Aug. 4, 1995
  § 102(e) Date: Aug. 4, 1995
[87] PCT Pub. No.: WO95/16318
  PCT Pub. Date: Jun. 15, 1995

[30] Foreign Application Priority Data

Dec. 8, 1993 [FR] France ................................ 9314706

[51] Int. Cl.⁶ .................................................. H04L 12/24
[52] U.S. Cl. ........................ 370/419; 370/467; 370/535
[58] Field of Search ........................ 370/56, 58.1, 58.2, 370/85.1, 85.13, 85.14, 94.1, 112, 13, 17, 359, 384, 395, 410, 419, 420, 426, 467, 469, 522, 535, 537, 542; 395/200.1, 200.2, 280, 309, 311, 600, 550

[56] References Cited

U.S. PATENT DOCUMENTS

4,903,258  2/1990  Kuhlmann et al. ................ 370/85.2
5,047,923  9/1991  Elstner et al. ...................... 395/600
5,301,303  4/1994  Abraham et al. ................... 395/500
5,367,635  11/1994 Bauer et al. ........................ 395/650
5,434,863  7/1995  Oshini et al. .................... 370/85.13

Primary Examiner—Hassan Kizou
Attorney, Agent, or Firm—Venable, Baetjer, Howard & Civiletti, LLP

[57] ABSTRACT

A system for transmitting information between a source and a receiver via a network to which is connected telecommunications equipment (1) comprising a plurality of interfaces (3, 4, 5, 6, 7) for various communication services (ATM, CODEC, LAN, X25) as well as an interface (2) between the equipment (1) and external administration equipment (10). In a preferred embodiment of the invention the various telecommunications resources of each module are structured in the form of objects whose properties are in conformity with those defined in the Common Management Information Service Element CMISE service recommended by the CCITT; the communication protocol Common Management Information Protocol CMIP is extended to within the equipment; and the objects accessible to the external administration are instances of classes defined in the information base MIB. Moreover, the hardware and logic processing are spread over the various modules.

11 Claims, 6 Drawing Sheets

COMMUNICATIONS INTERFACE FOR CONNECTION BETWEEN TELECOMMUNICATIONS EQUIPMENT AND INTERFACE MODULES

The present invention relates to a transmission system for transmitting information between a source and a receiver via a network, to which network is connected telecommunications equipment comprising a bus dedicated to the exchange of management messages between a plurality of interface modules for various communication services and at least a supervisory module used as an interface between said equipment and external administration equipment.

The invention likewise relates to telecommunications equipment as described above and, particularly, to a service multiplexer for an ATM network.

Such a system is described, for example in the article entitled "BREHAT, premier réseau à haut débit réalisé en technologie ATM" by J. Legras, G. Onno and M. Lemonier, published in the journal of "Commutation & Transmission" no. 3, 1991. Its telecommunications equipment are generally managed by external administration equipments, a dedicated communication protocol being used at the interface between these two types of equipments to transmit varied information signals which relate to the operation of said telecommunications equipment.

It is a first aim of the invention to provide maximum simplification of this interface.

Therefore, an information transmission system according to the invention and as described in the opening paragraph is characterized in that for internally transmitting said management messages said telecommunications equipment comprises communication means based on a similar communication protocol to that used between the external administration equipment and the supervisory module.

It is thus possible to avoid any conversion at the OSI application level in the supervisory module of such equipment. Telecommunication equipments of such a system comprise interfaces for varied, real-time telecommunications services, and are therefore naturally evolutive. The introduction of a new interface module for a new service implies considerable modifications with respect to the supervisory module.

A further aim of the present invention is therefore to propose an information transmission system whose telecommunications equipment is designed to facilitate such evolution by minimizing its impacts on the developments realised in the past.

Therefore, an information transmission system according to the invention and as described in the opening paragraph is characterized in that with respect to their management the telecommunications resources of each module are structured as objects which correspond as regards software to an encapsulation of management information generated by said resources and of operations that can be applied to this information.

In a particularly advantageous embodiment of an information transmission system according to the invention said telecommunications equipment thus comprises for the internal transmission of said management messages communication means based upon the Common Management Information Protocol (CMIP) recommended by the CCITT while said objects have the following properties which form part of the Common Management Information Service Element (CMISE):

attributes, operations with respect to these attributes and to the object itself, and notifications.

The CMIP protocol which is based upon the common service element CMISE actually provides the advantage of being largely distributed in the field of network administration.

In this case, in order to avoid any conversion of data structure between the external administration and the internal management of the telecommunications equipment, each of said objects is advantageously:

either an instance of a class defined in the Management Information Base (MIB) recommended by the CCITT, or a specific object for internal needs in each module.

Finally, each module advantageously supports the objects which determine its own telecommunications resources and, to handle said objects, comprises hardware means and software means and, more specifically, communication means associated thereto, while the number of centralized functions in the supervisory module are minimized.

A systematic return of the data towards the supervisory module is thus avoided, which minimizes the processing time, and the future evolutions are made easier because the various modules are then mutually autonomous.

Other particularities, details and advantages of the invention will be clarified by the following description made with reference to the appended drawings which are given by way of examples which are not exhaustive, and in which.

Figure 1:
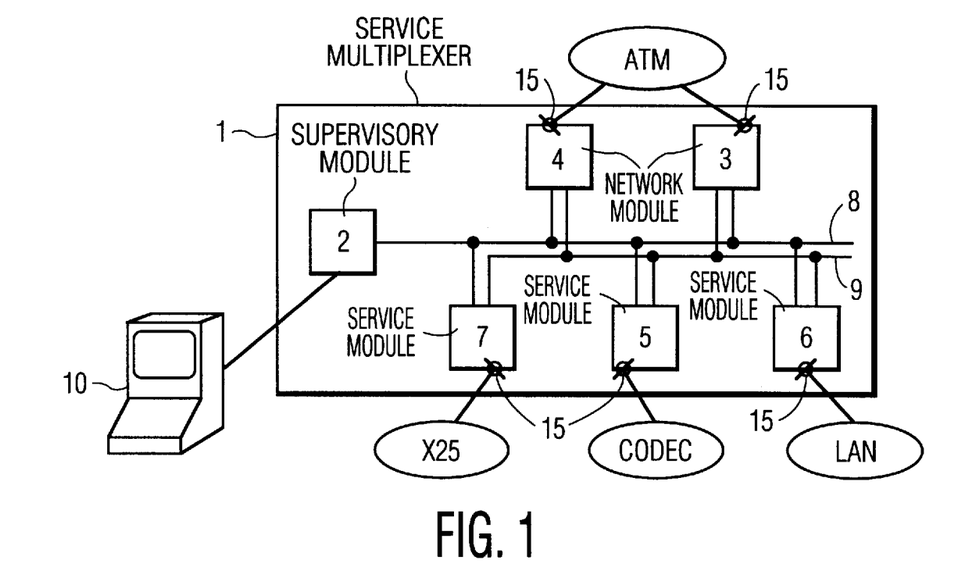
FIG. 1 shows an example of a service multiplexer for an ATM network according to the invention.

Prior to the description of an information transmission system according to the invention, telecommunications equipment of such a system will be described first. The telecommunications equipment to be described by way of example in the following is a service multiplexer for an ATM network. Such an ATM service multiplexer is shown in FIG. 1. Its role is to multiplex various services (X25, local network and video conference network in this embodiment) on a high-rate ATM link. Therefore the multiplexer comprises a supervisory module 2 and five interface modules: two network modules 3 and 4 connected via hardware accesses 15 to the ATM network, and three service modules 5, 6 and 7 connected via hardware accesses 15 to a codec (coder-decoder) for video conference, to a local area network LAN and to a network X25, respectively. These six modules are interconnected by a bus 8 dedicated to the internal management of the equipment. The five interface modules are furthermore interconnected by a data bus 9 dedicated to transporting ATM cells and as described, for example, in French Patent Application no. 9303775 filed Mar. 31, 1993 by the Applicants. Finally, in this embodiment the supervisory module 2 is connected to an external local administration station 10.

The functions of such equipment can be subdivided as follows:

hardware functions, which comprise:

the conversion of protocols of the various services into an ATM protocol, and vice versa, the very high rate multiplexing and demultiplexing of various services processed simultaneously, the physical adaptation to various types of interfaces.

internal management functions, which comprise:

the configuration and reconfiguration of the hardware, the survey of performance and loading, the management of errors, the management of the security the communication with the external administration system constituted by station 10.

In the embodiment to be described below each module has its associated processing capacity, data capacity and memory capacity and the software is distributed as much as possible in the various modules of the equipment so as to process nearly all the management information generated by the hardware functions. Moreover, each module is autonomous, so that it can be withdrawn from or used in a piece of equipment without interference with the operation of the other modules. Thus, the supervisory module primarily ensures a bridging function towards the external administration system and it handles various centralized applicative functions.

Figure 2:
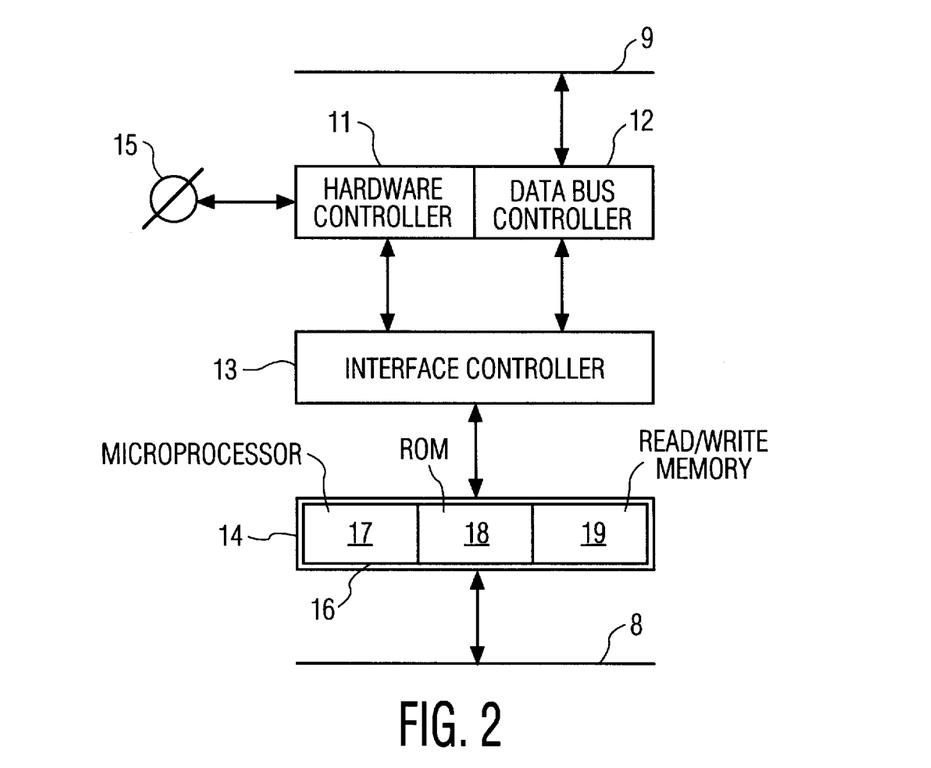
FIG. 2 is a diagram representing an example of the functional structure of an interface module of telecommunications equipment according to the invention.

FIG. 2 shows the functional structure of a module of telecommunications equipment according to the invention. It comprises four functional subsets:

a subset 11 for handling hardware functions (services or network) of the module based upon data available on its hardware access 15 (service access or network access), a subset 12 which manages the access to the data bus 9, a subset 13 which is used as a management interface between the subsets 11 and 12, on the one hand, and, on the other hand, a subset 14 charged with the internal management of the equipment. This management interface gathers the management information generated by the hardware functions and/or by the subset 12 which manages the access to the data bus 9, in the form of counter alarms, counter states, and it transmits them to the subset 14.

the subset 14, which comprises a microprocessor unit 16 based upon, for example, M68302 manufactured by Motorola, receives management information either from the interface subset 13 or the management bus 8, and it executes the following operations:

it provides hardware configuration based upon received management information, it collects the information signals generated by the hardware, it evaluates performance criterions, it returns information signals to the supervisory module on request via the management bus 8. The microprocessor unit 16 in fact comprises a microprocessor 17, a read-only memory 18 in which is stored all the software that permits the realisation of various processes, and a read/write memory 19.

A certain number of hardware functions thus corresponds to each module, and management information (performance, defaults, rate making, configuration) which are processed by the internal management subset 14 are associated to each of these functions.

The logical or physical telecommunications resources of each module (module, physical access, communication layer . . . ) are structured as regards their management in the form of objects which correspond from the point of view of software to an encapsulation of management information and of processes that can be applied to this information.

To each type of resource is thus associated a type of object called "class" which is in fact a generic model that gathers the information and includes processes which are characteristic of this type of resource. Each class has, for example in the form of a programmed function, a "constructor" whose role it is to create the new objects of the class called instance of the class. Each class is thus "instanced" in as many real elements as are necessary. This process is accompanied by a memory allocation. In fact, the data of each object are gathered in a block of the read/write memory 19 under the control of a memory allocation service. When the object is created, this service allocates a reference to the number of the empty memory block to the object. This number is then used as a local instance number to refer to the object at module level. Thus, each time it is necessary to have access to this object, the memory allocation service produces the address of the memory block which contains the object data on the basis of this local instance number. On the other hand, when the object is created, this equipment allocates an aggregate instance number to the object, which number makes it possible to reference the object at equipment level. This aggregate instance number is formed by:

the number of the plug of the module supporting the object on the management bus, the class of the object, the local instance number, and a binary element that indicates whether the external administration either or not has access to this object.

Similarly, each class has a "destroyer" whose role it is to destroy the previously created objects of a class and this operation is accompanied by the restoration of the memory that had been assigned to each of these objects.

Figure 3:
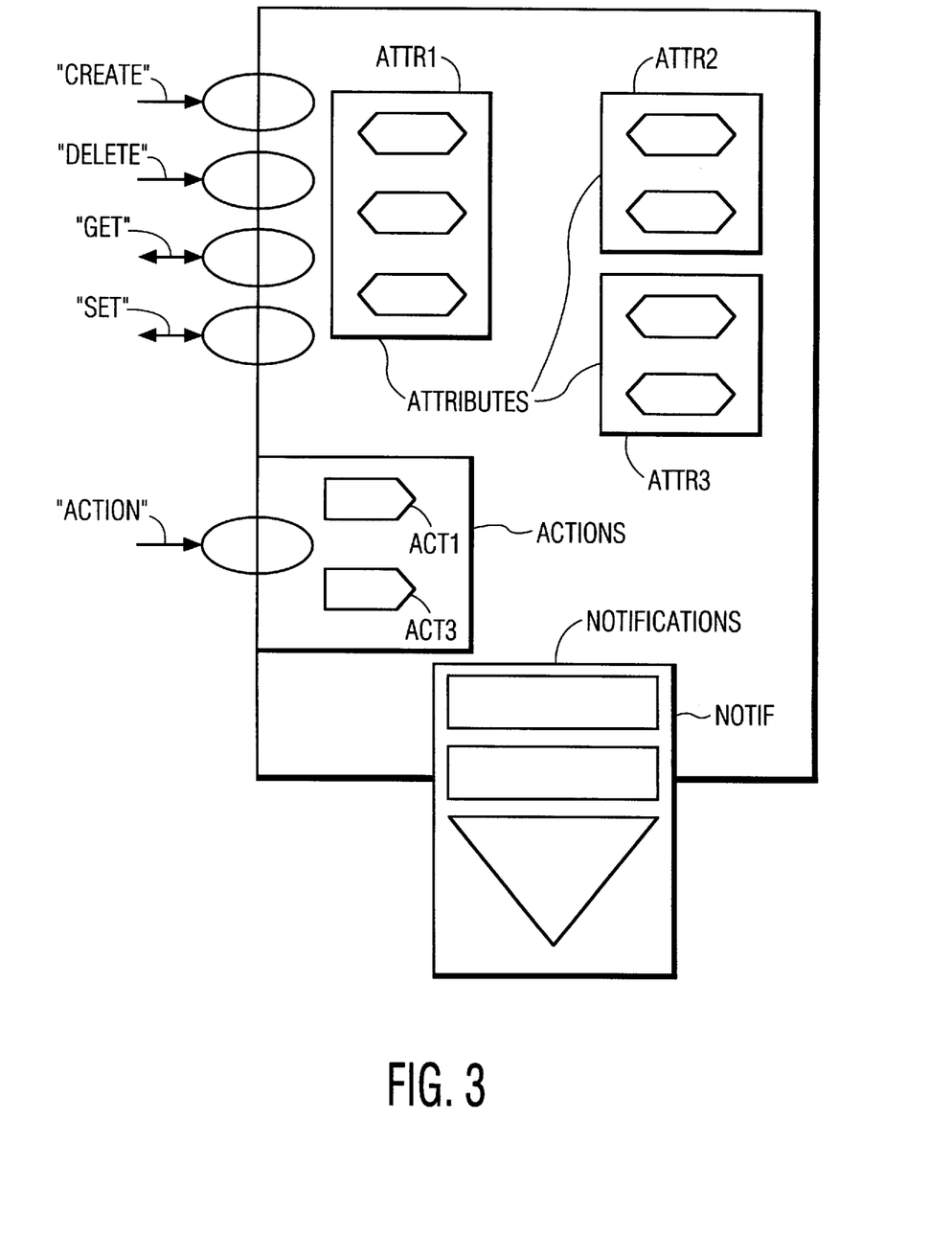
FIG. 3 is a diagram giving a symbolic representation of a class of an object.

FIG. 3 gives a symbolic representation of the classes on the basis of which the objects are created that determine the telecommunications resources of each module. In a particularly advantageous manner the objects accessible to the external administration are instances of classes defined in the Management Information Base (MIB) recommended by the CCITT.

The characterizing properties of these object classes are the following:

attributes ATTR 1, ATTR 2 and ATTR 3 which form the data of the object and which have a value that can be consulted and/or modified on request addressed to the object. Three types of attributes are defined: attributes ATTR 1 that can be consulted by the administration, attributes ATTR 2 that can be consulted and modified by the administration, and internal attributes ATTR 3 inaccessible to the administration, operations with respect to attributes: a consultation operation called "GET" and a modifying operation called "SET", operations with respect to objects: a create operation called "CREATE" relating to the sons of the object, a destroy operation called "DELETE" and action operations called "ACTION" which are defined from one case to the next for each object. Two types of actions are defined: the actions ACT I which can be used by the administration and the actions ACT 2 which cannot.

notifications of events NOTIF: an object transmits a notification at each occurrence of an event it detects when a notification of such an event is requested in the definition of its class.

Examples of these properties will be given in the following description.

Thus, this object structuring uses the formalism required by the service element CMISE (Common Management Information Service Element) which has been defined by the CCITT to permit, more specifically, exchanges between pieces of telecommunications equipment and administration systems in the form of requests and/or responses to requests so as to realise, on the one hand, management operations such as a consultation, an updating, a creation or a deletion of management information and, on the other hand, notifications of events.

The base MIB, the service element CMISE and the principle of the object representation are described in the publication "Les normes de gestion de réseau à l'ISO" by C. Lecerf and D. Chomel, published in 1993 by MASSON in "Collection technique et scientifique des télécommunications".

In the following description an example will be given of the object structure of a service module: the video conference module. However, it seems necessary though to present first the main characteristics of a video conference service while an ATM network is used.

Figure 4:
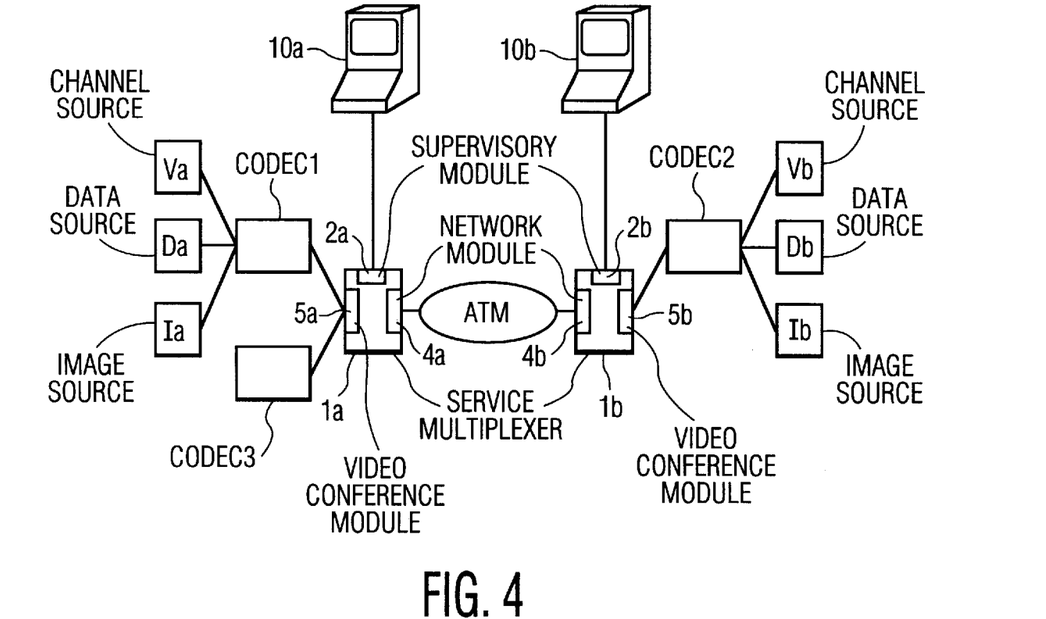
FIG. 4 is a diagram representing an example of the information transmission system according to the invention.

FIG. 4 shows, amongst other things, an embodiment for the information transmission system according to the invention, which allows of the interconnection of two codecs CODEC1 and CODEC2 across an ATM network. To this end, said ATM network comprises two ATM service multiplexers 1a and 1b which are connected to the network via respective network modules 4a and 4b which are connected each to an external local administration station 10a and 10b respectively, by a supervisory module 2a and 2b, and which multiplexers comprise a video conference module 5a, 5b, respectively. Thus, information signals coming from data sources Da and Db from speech sources Va and Vb or images sources Ia and Ib respectively are multiplexed in a frame in accordance with Recommendation H221 of the CCITT and transmitted to either video conference module 5a, 5b respectively, at a rate equal to n.384 kb/s (where n is an integer between 1 and 5) which rate is liable to change during the communication. Each video conference module is capable of managing a plurality of separate services: this is the case, for example, with module 5a which is also connected to a third codec CODEC3.

The interface between the codecs and the service multiplexers is in accordance with Recommendation G703 (physical adaptation of transmitted data) and G704 (definition of the frame) of the CCITT for the physical layer and with Recommendation H221 for the higher layers.

The ATM transfer network and the interfaces it has with the service multiplexers are described in said article entitled "BREHAT, premier réseau à haut débit réaliséen technologie ATM".

Figure 5:
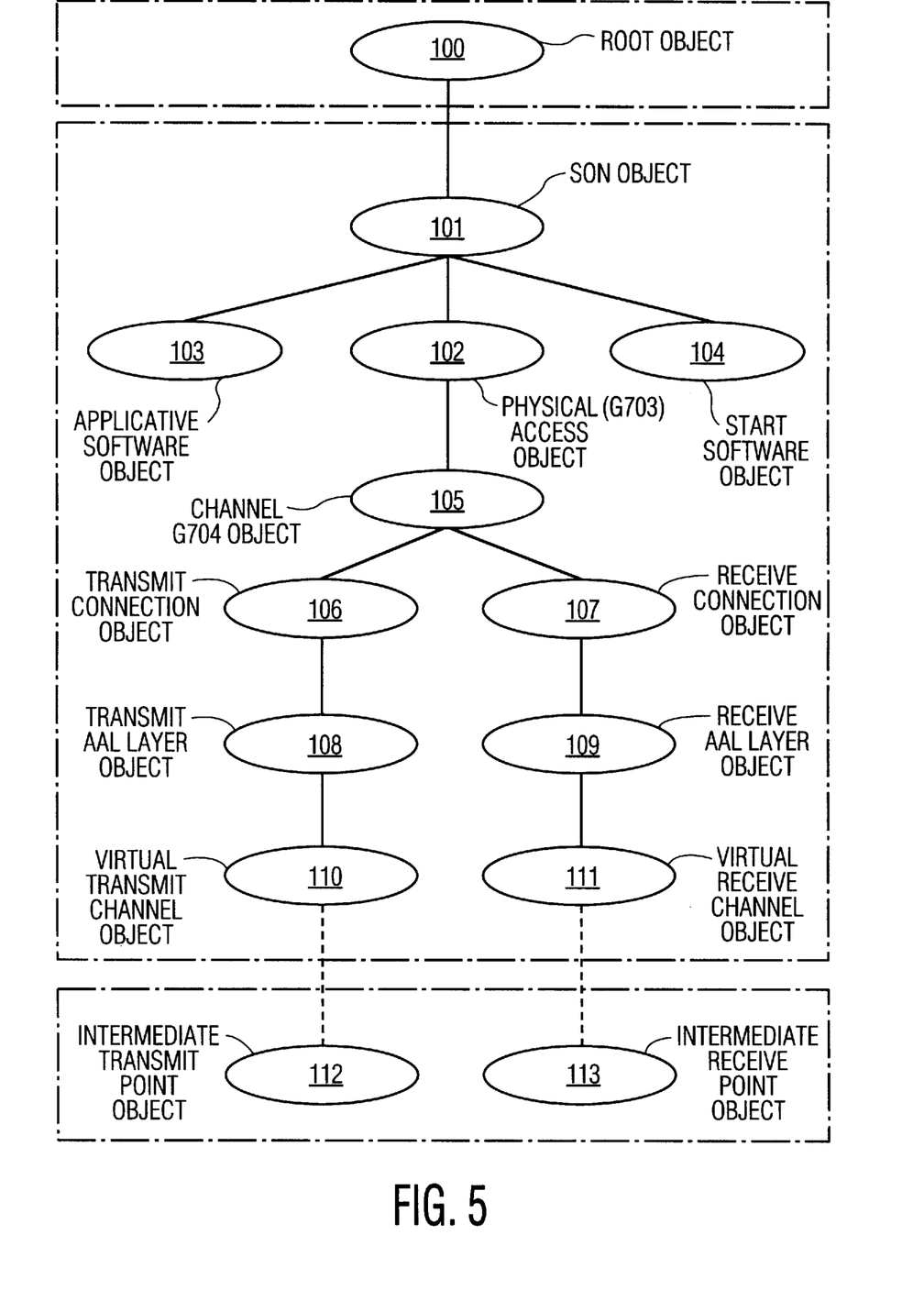
FIG. 5 is a diagram representing an example of how objects of a video conference module of an ATM service multiplexer according to the invention are arranged.

FIG. 5 is a diagram representing the setting up of objects of a video conference module. Three types of objects are used:

centralized objects which are situated on the supervisory module, decentralized objects which are situated on the interface modules (this is the case that occurs most, because the software is spread most in the various modules of the equipment so that the management information generated by the hardware is processed as accurately as possible), and spread objects which are situated both on the supervisory module and on the interface modules.

A particular object called centralized "root" object is defined. It is introduced at a predefined memory address and allows of direct access to the highest level of dependence in the father-son hierarchy established between the objects. For each interface module, a spread object called "module" object allows of ensuring the connection between the root object and the other objects of the module. This "module" object is the first object created during the start.

According to FIG. 5 the "root" object 100 introduced in the supervisory module includes a son object 101: the "module" object which is spread over the supervisory module and over the video conference module. This module object itself includes at least three son objects introduced in the video conference module:

an object 102 (via video conference service managed by the module) representing the physical access in accordance with Recommendation G703 of the CCITT called "G703 access" object, an object 103 representing the applicative software of the module so as to be able to identify the module (by its type number, its size . . . ) and also to authorize certain operations with the software (for example, a remote loading, a start, a stop, a deletion . . .

an object 104 for similarly representing the start software of the module.

The "G703 access" object includes a son object 105 called "channel G704", which represents the channel to the interface between the service multiplexer and the codec, in accordance with Recommendation G704 of the CCITT. Similarly, the "channel G704" object includes two son objects:

an object 106 called "n.384 kb/s transmit connection" which represents the connection from the codec to the service multiplexer, which connection has a bit rate equal to n.384 kb/s.

and an object 107 called "n.384 kb/s receive connection" which represents the connection from the service multiplexer to the codec, which connection has a bit rate equal to n.384 kb/s.

The object called "n.384 kb/s transmit connection" includes a son object 108 called "transmit AAL layer" which represents an asynchronous transfer mode adaptation layer (called AAL layer) in the transmit direction, that is to say, from the codec to the service multiplexer. This layer converts any specific service into a stream of undifferentiated cells. And the object called "n.384 kb/s receive connection" includes a son object 109 called "receive AAL layer" which represents this AAL layer in the receive direction, that is to say, from the service multiplexer to the codec.

The object called "transmit AAL layer" has a son object 110 called "virtual transmit channel" which represents the ending of a virtual channel from the module to the transmit ATM network. And the object called "receive AAL layer" has a son object 111 called "virtual receive channel" which represents the ending of the virtual channel from the module to the receive ATM network.

Finally, the object called "virtual transmit channel" includes an object 112 called "intermediate transmit point" which is set up in the network module that handles this virtual channel and which makes it possible to connect the output of the video conference module to the input of the corresponding network module. Similarly, the object called "virtual receive channel" includes an object 113 called "intermediate receive point" set up in the network module that handles this virtual channel.

Figure 6:
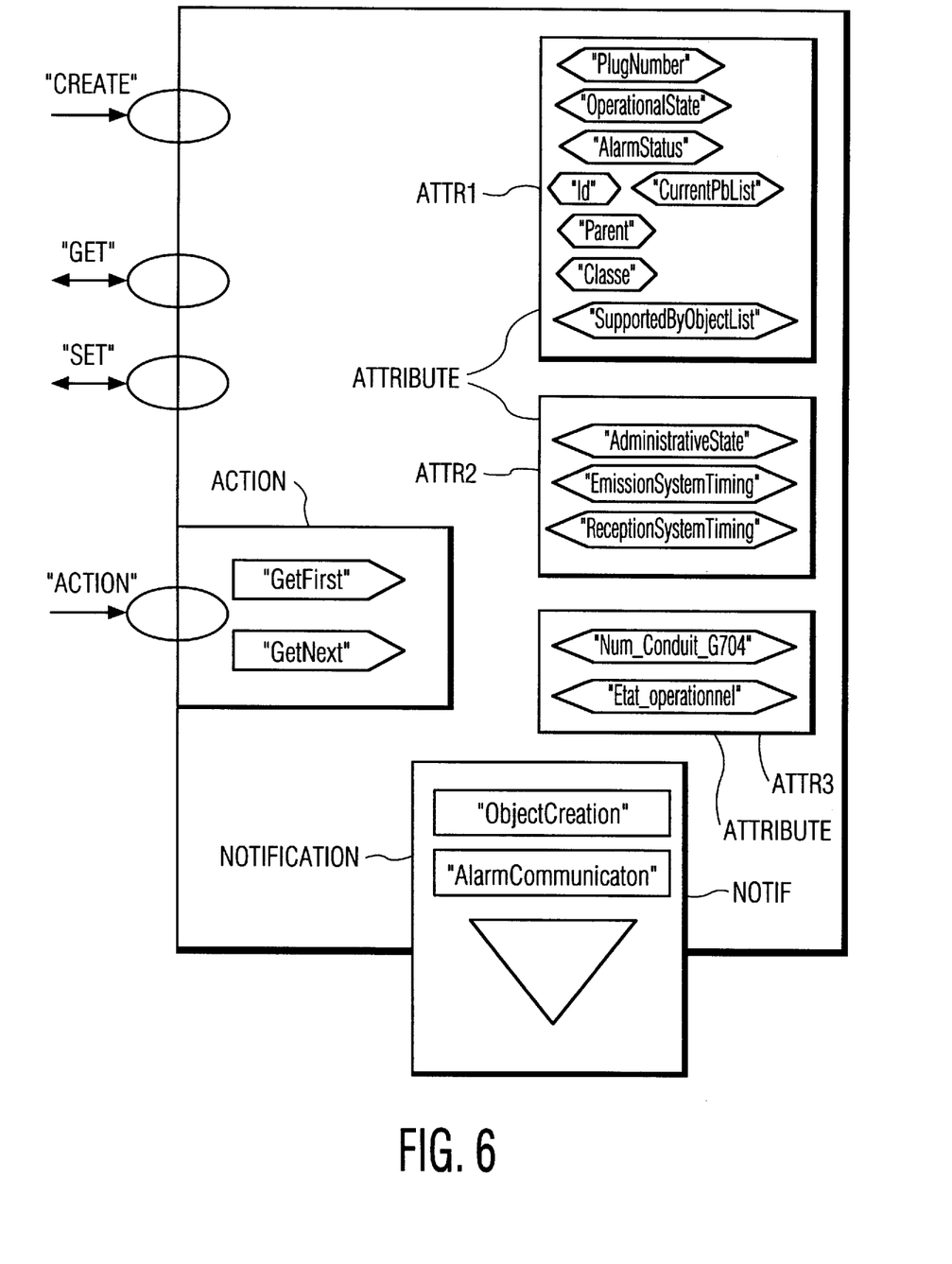
FIG. 6 is a diagram giving a symbolic representation of an object of the video conference module called "path G703" object.

By way of example FIG. 6 symbolically represents one of the objects of a video conference module: the object called "G703 access".

This object represents the physical access in accordance with Recommendation G703 of the CCITT for the video conference service. It is automatically created by its father object, the "module" object, when the module is inserted into the service multiplexer, and destroyed when it is withdrawn therefrom. The administration can neither create nor destroy this object which explains the absence of the "DELETE" operation, but it can consult and/or modify the values of certain of these attributes by the operations "GET" and "SET". The attributes that may be consulted by the administration are the following:

an attribute "Id" which contains the aggregate instance number of the object and is used as a reference for the operations on the latter,     an attribute "Parent" which contains the identifier of the father object of the "G703 access" object, that is to say, of the "module" object,     an attribute "Classe" which contains the identifier of the class to which the object belongs. It is to be noted that these three first attributes are present in all the objects and make it possible to indicate the inter-object relations,     an attribute "SupportedByObjectList", normalized by the CCITT, which represents the list of objects of which the state can affect the state of the object under consideration. It makes it possible to join physical resources and logical objects,     an attribute "PlugNumber" which contains the number of the plug of the module supporting the object to the management bus 8,     an attribute "OperationalState" which contains the operational state of the resource. This state may be "in service" or "out of service", the "out of service" state being attained when the object or a resource on which it depends is in an alarmed state,     an attribute "AlarmStatus" which contains the alarm status of the object (most serious current alarm),     an attribute "CurrentPbList" which contains the list of the current alarms in the object.

The attributes that can be consulted and modified by the administration are the following:

an attribute "AdministrativeState" which contains the administrative state of the resource. This state may be "open" or "closed",     an attribute "EmissionSystemTiming" which contains the choice of the transmit clock. In fact, the video conference service being a real-time service, the two ends of a link have to be in synchronism (in sync). Thereto, various choices are possible under the control of the administration: the clock is provided, for example, either by the coder or the service multiplexer, the latter utilizing then either its own local clock or a clock adjusted to the reception of the ATM network, or a clock coming from an external network dedicated to clock distribution,     an attribute called "ReceptionSystemTiming" which contains the choice of the receive clock. As the decoder is adjusted to the service multiplexer, various choices (similar to those mentioned before) remain possible under the control of the administration.

The "G703 access" object further includes two internal attributes; the first called "Num-Conduit-G704" contains the aggregate instance number of the "path G704" object which is situated under this "G703 access" object; and the second called "Etat$_{13}$ opérationnel" indicates the operational state (active or inactive) of the object.

The linking of objects that has been chosen in this example consists of making the father object point towards the son object, each son object itself pointing towards the two brother objects around it and to their father object. Two actions "GetFirst" and "GetNext" are thus defined to be able to access various interlinked objects: the action "GetFirst" makes it possible to access the first son object after which the action "GetNext" makes it possible to access subsequent son objects. These two actions make it possible to obtain information about the object "G704 channel" contained in an instance "G703 access".

Similarly, two notifications are defined. The first notification called "ObjectCreation" is a notification which follows the creation of the "G703 access" object when the module is inserted. The second notification called "AlarmCommunication" is transmitted in case there is a clock problem and in the case of transmit signal loss.

Summarizing, this object structure of the physical access resource G703 of a video conference module makes it possible to manage managing information assigned thereto, that is to say:

the defaults of loss of clock and signal loss on transmission,     the configuration of the transmit clock, of the receive clock and of the administrative state of the resource.

There will now be described an example of the "constructor" function of the class called "G703 access" which makes it possible to create such a "G703 access" object. This function carries out the following operations:

Verification of the number of the plug of the video conference module which is associated to the video conference service for which the "G703 access" object is to be created. In this embodiment each video conference module supports two connections to the video conference services. This number of the plug can thus only assume the value 1 or 2. For any other value the constructor function calls an applicative defence task which will be described hereinbelow and which permits to handle the errors.

Initialization of the values of the attributes "OperationalState", "AlarmStatus", "PlugNumber", "AdministrativeState", "EmissionSystemTiming" and "ReceptionSystemTiming" with their value defined by default.

Initialization, as required, of the values of the three attributes "AdministrativeState", "EmissionSystemTiming" and "ReceptionSystemTiming" (which are the only ones that can be modified by the external administration) with the values that have become parameters of the constructor function, after having verified that, on the one hand, the values of the attributes that have become parameters are valid and, on the other hand, their number does not exceed three. In the opposite case, the constructor calls the applicative defence task.

Allocation to the object of a temporary storage block by calling a memory allocation task which assigns thereto in exchange a reference number of a free memory block used as a local instance number of the object.

Initialization of the list of attributes to be returned by the constructor function, each of these attributes being defined by three magnitudes:

the type of attribute Id, Parent, Class, SupportedByObjectList, OperationalState, AdministrativeState, AlarmStatus, CurrentProblemList, PlugNumber, EmissionSystemTiming and ReceptionSystemTiming,         the type of the value of the attribute (an integer of 16 or 32 bits, a Boolean value or a list),         the value of the previously initialized attribute.

Initialization of the internal attribute containing the aggregate instance number of the son object "G704 path" of the object "G703 access".

Writing in a memory of the object "G703 access" and calling the applicative defence task in the case of failure.

Notification of the creation of the object.

By way of example there will be described a first function called "GET" which makes it possible to realise a "GET" operation with the attributes of an object of the class "G703 access", followed by a second function called "action" which makes it possible to realise either action "GetFirst" or "GetNext" with an object of the same class.

The steps of said "GET" function are the following:

Obtaining the local instance number of the object based upon its aggregate instance number.

Recuperation of the address of the beginning of the memory block in which the data of the object are written based upon the local instance number of the object.

Test of the type of attribute to be read which has become a parameter of the function and, if it relates to one of the authorized types, initialization based upon the data read from the memory of the return variable which has two fields which indicate the type of value and the value as such, respectively.

Call of the applicative defence task in the case where the type of the attribute that has become a parameter is not identified.

The steps of said "action" function are the following:

Test of the origin of the request for action: the request comes either from inside the object, or from the external administration, from the supervisory module or from the video conference module which supports the object. In all other cases the "action" function calls the applicative defence task.

Test of the nature of the requested action. If it does not relate either to a "GetFirst" action or to a "GetNext" action, the "action" function calls the applicative defence task.

The local instance number of the object is obtained based upon its aggregate instance number.

The address of the beginning of the memory block in which the data of the object are written is recovered based upon the local instance number of the object.

Handling the action "GetFirst":

verify whether the son object whose aggregate instance number is to be returned by the action is actually an instance of the class "G704 path", and call the applicative defence task in the opposite case;

initialize the variable response which has five fields: the type of the response (here it is about a response to an operation "GET"), the type of the returned variable by the action (here it is about a aggregate instance number of the object), the number of son objects (which is equal to one when the object "G703 access" actually has a son, and to zero in the opposite case), the class of the son object and the aggregate instance number of the son object (which is equal to zero when the object "G703 access" does not have a son).

Handling the action "GetNext": if the object "G703 access" has only a single son, the action "GetNext" does not affect this object. The "action" function thus calls the applicative defence task.

As the principle of the structure in the form of objects of the telecommunications resources of the various modules has been explained hereinbefore, there will now be described in detail the processing of these objects by the local management subset 14 of each module.

Figure 7:
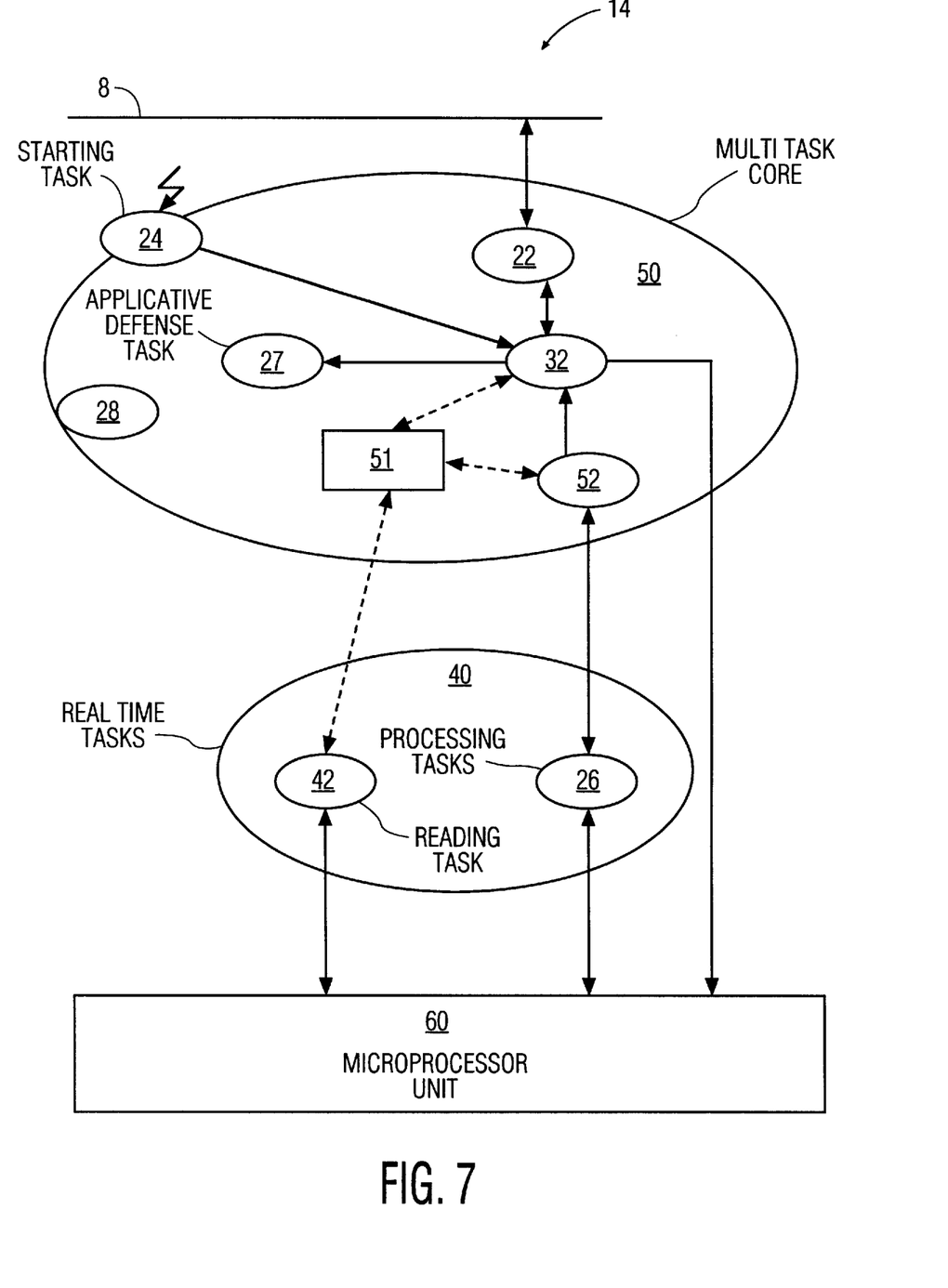
FIG. 7 is a diagram representing an example of the architecture of the software of a local operation subset of a video conference module of a service multiplexer for the ATM network according to the invention.

The architecture of the software of such a subset is shown in FIG. 7.

According to FIG. 7 such a subset has two types of tasks: on the one hand, real-time and/or immediate tasks 40 (that is to say, triggered by an interruption) formed by a processing task 26 for processing the time and a reading task 42 for reading the counters, and, on the other hand, tasks 50 differentiated under the control of a multitask core (for example of the VRTX type).

The tasks 50 include:

at least a task 32 called configuration task which includes the functions of configuration, reconfiguration, alarm handling and post counting, to manage the objects of the module which objects represent the telecommunications resources of the module, a task 24 for starting the system, an applicative defence task 27 of the software, a bottom task 28, intertask communication means 22, and a monitoring task 52 cyclically triggered by the time processing task 26, to read the statuses of the microprocessor unit 16 (more particularly the alarm statuses) and to trigger the necessary actions (reconfigurations, as required) in the case of a default.

The intertask communication means 22 uses at the applicative level the Common Management Information Protocol (CMIP) defined by the CCITT as a Common Management Information Service Element CMISE. Thus, the service of messaging between the external administration system and the telecommunications equipment is extended to within this equipment between the various modules. This makes it possible to avoid any superfluous conversion at the supervisory module which, because of this, has only the role of adapting low layers.

The possible exchanges are either a transmission of a message towards an object denoted by a transport address, or a transmission of a message sent to all the objects of all the modules which determine telecommunications resources.

Each of these messages comprises a first header called transport header, a second header called object header and a data field which comprises a list of attributes, actions or events which correspond to a request, to a response to an operation or to a notification. The transport header allows the definition of:

a transport address of the destination object (this address is, for example, formed by the number of the plug of the module in which the object is situated followed by the local instance number of the object), the transport address of the dispatching object, the type of transport message (broadcast or not), the length of the data field. The object header similarly allows the definition of:

the aggregate instance number of the destination object, the aggregate instance number of the dispatching object, the code of the requested operation (consultation, modification, creation, destruction and action, request or respond mode, notification), the use of the confirmation mode or not, an identification number of the request, the number of attributes to which the request or the notification refers.

Figure 8:
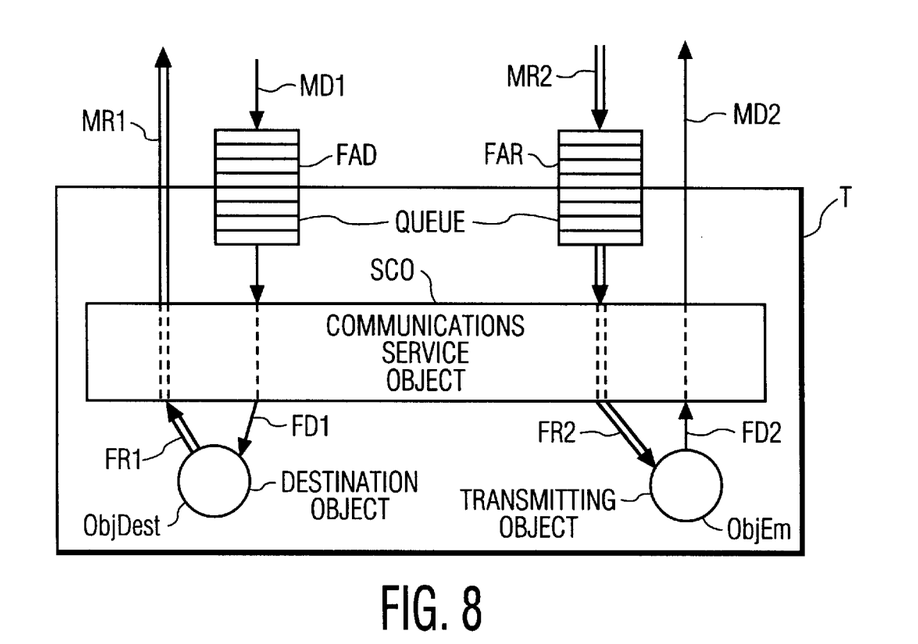
FIG. 8 is a diagrammatic representation of an example of object communication server.

Between two tasks located either or not on the same module, the communication object proceeds via this message service with a request message after which comes, as required, a return message for the confirmation mode. Therefore, each module has an Object Communication Server SCO as is represented in FIG. 8, which is utilized by each task that uses an object representation to ensure:

the translation of a message MD1 having an external request for task T into the calling of an internal request function FD1 which corresponds to one of the authorized operations to the destination object ObjDest, followed by the translation of an internal response function FR1 transmitted via the destination object ObjDest into a transport response message MR1. The request messages MD1 are delivered to a first queue FAD in which the task T is awaiting a message most of the time.

the translation of an internal request FD2 into an external request message MD2, followed by the waiting in a second queue FAR of an external response message MR2 and, finally, the translation of this external response message MR2 into an internal response function FR2 applied directly to the transmitting object ObjEm.

The communication mechanism between two objects of a same task utilizes directly the internal call functions FD and response functions FR without passing through the message service.

The task 24 for starting the system transmits an action request message (creation of various objects, configuration or reconfiguration of the hardware and/or software, possibly reinitialization of the alarm attributes) to the configuration task. Then this message is converted and switched to the object "module" by the communication object service of the configuration task.

The applicative software defence task 27 makes it possible to handle internal irregularities of the software. As this has been indicated during the description of the "constructor", "GET" and "action" functions, error detection points are provided in the software which, in the case of error, calls this defence task of the system, so that it evaluates the probable type of error and activates the process provided therefore.

Finally, the tasks 40 include the time processing task 26 which is an immediate task, and the real-time task 42 for reading the counters (performance and rate making) of the module. These countings are realised of sixteen binary elements at the microprocessor unit 60 and the results are cyclically returned to the management subset 14 in order to have them accumulated in thirty-two binary elements, and thus for a much longer period of time. These software counters can be consulted by the configuration task 32 which can then update the various attributes of its objects.

Each module further comprises, facultatively, one or various tasks called historical tasks (not represented in FIG. 7), of less priority than the configuration task 32 described above for managing objects called historical objects (various tasks are used when it is necessary to assign different priorities to them). These objects are either recorders or recordings, each recorder ensuring the storing for a certain period of time in the form of recordings of events of the same type. Concretely, the recorder object is then the father of a sequence of recording objects of the same type. Thus, various types of recording objects are defined as, for example, recordings of events of:

alarm,
change of attributes,
change of the state of an object,
creation of an object,
destruction of an object.

The external administration can selectively access these recordings to read or delete them.

Any person skilled in the art working in the field of telecommunications and having common knowledge of the C-language is capable of implementing the invention.

Obviously, modifications may be made with respect to the embodiment which has been described, more specifically by substituting equivalent technical means, without leaving the scope of the present invention.

More particularly, and although the invention has been described for a service multiplexer for ATM networks, it applies to a wide range of telecommunications equipment.

I claim:

1. An information transmission system for transmitting information between a source and a receiver via a network, to which network is connected telecommunications equipment comprising a bus dedicated to the exchange of management messages among a plurality of interface modules for various communication services and at least a supervisory module used as an interface between said equipment and external administration equipment, said telecommunications equipment comprising transmission means for transmitting said management messages among said interface modules, said transmission means being based on a communication protocol similar to that used between the external administration equipment and the supervisory module.

2. An information transmission system as claimed in claim 1, in which each of the modules of said communications equipment comprises a plurality of telecommunications resources structured as objects, said objects corresponding respectively to (i) management information generated by said resources and (ii) operations that can be applied to this information.

3. An information transmission system as claimed in claim 2, in which each module supports the objects which determine its own telecommunications resources and, to handle said objects, comprises hardware means, logical means and communication means associated thereto, while the number of centralized functions in the supervisory module are minimized.

4. An information transmission system as claimed in claim 3, characterized in that an aggregate instance number is allocated to each object when created, so as to refer to said each object at the equipment level.

5. An information transmission system for transmitting information between a source and a receiver via a network to which is connected a telecommunications equipment which comprises a bus dedicated to the exchange of management messages between a plurality of interface modules for various communication services and at least a supervisory module used as an interface between said equipment and external administration equipment, and transmission means for transmitting said management messages among said modules, each of these modules comprising a plurality of telecommunications resources structured as objects, said resource corresponding respectively to (i) management information generated by said resources and (ii) operations that can be applied to this information.

6. An information transmission system as claimed in one of the claims 2 or 5, said transmission means being based upon the Common Management Information Protocol recommended by the CCITT X711 while said objects are configured according to a generic model complying with the Common Management Information Service Element CITT X710.

7. An information transmission system as claimed in claim 6,
   wherein a Management Information Base is defined which contains classes of said objects used by the external administration equipment, the objects of said modules which are accessible to the external administration equipment being instances of a class defined in said Management Information Base.

8. An information transmission system as claimed in claim 5, said transmission means further comprising an object communication server ensuring the translation of said management messages into a function request which implements operations that may be applied to a respective object.

9. An information transmission system as claimed in claim 6, said transmission means further comprising an object communication server ensuring the translation of said management messages into a function request which implements operations that may be applied to a respective object.

10. A telecommunications equipment for use in a system including external administration equipment and means for providing a plurality of various communication services,
   wherein said telecommunications equipment comprises a bus dedicated to the exchange of management messages among a plurality of interface modules for various communication services and a supervisory module used as an interface between said telecommunications equipment and said external administration equipment, said external administration equipment communicating with said supervisory module according to a given communication protocol, said telecommunications equipment comprising transmission means for transmitting said management messages among said interface modules, said transmission means being based on a communication protocol similar to said given communication protocol.

11. A service multiplexer for an ATM network for transmitting information between individual ones of hardware accessing devices, said multiplexer comprising a bus dedicated to the exchange of management messages among a plurality of interface modules for said hardware accessing devices and at least a supervisory module used as an interface between said modules and external administration equipment, said external administration equipment communicating with said supervisory module according to a given communication protocol,
   said multiplexer further comprising transmission means for transmitting said management messages among said interface modules, said transmission means being based on a communication protocol similar to said given communication protocol.

* * * * *